3,510,479
4-[2-(5-NITROFURYL)-VINYL]-PYRIMIDINES
Hideji Takamatsu, Amagasaki-shi, Hyogo-ken, Shinsaku Minami, Nara-ken, Akio Fujita, Inokumadori, Kamikyo-ku, Kyoto, Tadatsugu Yamamoto, Higashiyodogawa-ku, Osaka, Katsuro Fujimoto, Neyagawa-shi, Osaka-fu, Masanao Shimizu, Suma-ku, Kobe-shi, Hyogo-ken, Yoshiyuki Takase, Amagasaki-shi, Hyogo-ken, and Isao Nakanishi, Aza Oyamazaki, Oyamazaki-mura, Otokuni-gun, Kyoto-fu, Japan, assignors to Dainippon Pharmaceutical Co., Ltd., Osaka, Japan, a corporation of Japan
No Drawing. Filed May 20, 1963, Ser. No. 281,799
Claims priority, application Japan, Oct. 2, 1962, 43/43,901
Int. Cl. C07d 51/36, 51/38, 51/42
U.S. Cl. 260—240          6 Claims

ABSTRACT OF THE DISCLOSURE

The invention relates to 4 - [2 - (5 - nitrofuryl) - vinyl] pyrimidines, processes for production thereof and their utility in treatment of bacterial, fungal and protozool infections in man and domestic animals.

According to the present invention, there are provided new 4 - [2 - (5 - nitrofuryl) - vinyl] - pyrimidines of the following formula:

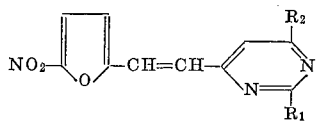

in which $R_1$ is a member selected from the group consisting of hydrogen and lower alkyls having 1 to 3 carbon atoms; and $R_2$ is a member selected from the group consisting of hydrogen, hydroxyl, alkoxyls having 1 to 3 carbon atoms, amino, monoalkylaminos having 1 to 3 carbon atoms, dialkylaminos having 2 to 4 carbon atoms, hydroxymethylamino, acetylamino and propionylamino.

More particularly, the lower alkyls having 1 to 3 carbon atoms encompassed by $R_1$ are methyl, ethyl, propyl and isopropyl. The alkoxyls having 1 to 3 carbon atoms encompassed by $R_2$ are methoxy, ethoxy and propoxy and isopropoxy. The monoalkylaminos having 1 to 3 carbon atoms encompassed by $R_2$ are methylamino, ethylamino, propylamino and isopropylamino. The dialkylaminos having 2 to 4 carbon atoms encompassed by $R_2$ are dimethylamino, methylethylamino, diethyl amino and methylpropylamino.

These new 4 - [2 - (5 - nitrofuryl) - vinyl] - pyrimidines have high activities against important Gram-positive and Gram-negative strains of pathogenic bacteria, such as *Micrococcus pyrogenes* var. *aureus, Escherichia coli, Shigella flexneri* and *Salmonella enteritidis*. Further, these compounds have antimycotic and antitrichomonal activities. It can be expected that these compounds are useful in the treatment of bacterial, fungal and protozool infections in man and domestic animals.

The new 4 - [2 - (5 - nitrofuryl) - vinyl] - pyrimidines can be prepared by condensing suitable 4-methylpyrimidines and 5-nitrofurfural according to a process which itself is well known. The condensation reaction between 4-methylpyrimidines and 5-nitrofurfural can be easily effected at an elevated temperature, if necessary in the presence of a condensing agent, such as hydrochloric acid, sulfuric acid, acetic anhydride, zinc chloride and sodium carbonate, if necessary, in a solvent, e.g., alcohols, acetic acid or benzene. The 4 - [2 - (5 - nitrofuryl) - vinyl] - 6-aminopyrimidines can also be obtained by hydrolyzing 4 - [2 - (5 - nitrofuryl) - vinyl] - 6 - acylaminopyrimidines, such as 4 - [2 - (5 - nitrofuryl) - vinyl] - 6 - acetyl-aminopyrimidine and 4 - [2 - (5 - nitrofuryl) - vinyl] - 6-propionylaminopyrimidine, according to a process which itself is well known. This hydrolysis is easily effected by heating with acids for about 2 hours. The 4 - [2 - (5-nitrofuryl) - vinyl] - 6 - hydroxypyrimidines can also be obtained by hydrolyzing 4 - [2 - (5 - nitrofuryl - vinyl]-6 - aminopyrimidine or 4 - [2 - (5 - nitrofuryl) - vinyl]-6 - acylaminopyrimidines, such as 4 - [2 - (5 - nitrofuryl)-vinyl] - 6 - acetylamino pyrimidine and 4 - [2 - (5 - nitrofuryl) - vinyl] - 6 - propionylaminopyrimidine, according to a process which itself is well known. This hydrolysis is easily effected by heating with acids for more than 5 hours. The 4 - [2 - (5 - nitrofuryl) - vinyl] - 6 - hydroxymethylaminopyrimidines can be obtained by heating 4-[2 - (5 - nitrofuryl) - vinyl] - 6 - aminopyrimidines with formalin, according to a process which itself is well known.

The following examples are given to illustrate the practice of the present invention, but are not to be construed as limiting.

EXAMPLE 1

14.7 grams of 5-nitrofurfural and 10 grams of 4-methylpyrimidine are dissolved in 32.5 cc. of acetic anhydride, followed by heating for one hour at 120–130° C. After cooling, crystals which separate off are filtered and recrystallized from dilute dioxane to give 15 grams of 4-[2-(5-nitrofuryl)-vinyl]-pyrimidine, M.P. 223° C. (dec.).

Substitution of zinc chloride for acetic anhydride as a condensing agent in the procedure affords 4-[2-(5-nitrofuryl)-vinyl]-pyrimidine likewise.

EXAMPLE 2

4.1 grams of 5-nitrofurfural and 3 grams of 2,4-dimethylpyrimidine are dissolved in 8 cc. of acetic anhydride, followed by heating for one hour at 120° C. After cooling, crystals which separate off are filtered and recrystallized from dilute ethanol to give 4.2 grams of 2-methyl-4-[2-(5-nitrofuryl) - vinyl] - pyrimidine, M.P. 204.5–205.5° C. (dec.).

EXAMPLE 3

3.3 grams of 2,4 - dimethyl - 6 - acetylaminopyrimidine is added to 3 grams of nitrofurfural dissolved in 7.5 cc. of acetic anhydride, followed by heating for 3 hours at 110–120° C. with stirring. After cooling, precipitate which separates off is filtered and recrystallized from acetonitrile to give 4.4 grams of 2 - methyl - 4 - [2 - (5 - nitrofuryl)-vinyl]-6-acetylaminopyrimidine, M.P. 207–208° C.

EXAMPLE 4

1 gram of concentrated sulfuric acid and 1.41 grams of 5-nitrofurfural are added under cooling to 1.23 grams of 2,4 - dimethyl - 6 - aminopyrimidine dissolved in 10 cc. of glacial acetic acid. The mixture is heated on water bath for 3 hours and then glacial acetic acid is distilled under reduced pressure. The residue is dissolved in 30 cc. of water and the solution is neutralized with aqueous saturated sodium bicarbonate. Crystals which separate off are recrystallized from acetonitrile to give 1 gram of 2-methyl-4 - [2 - (5 - nitrofuryl) - vinyl] - 6 - aminopyrimidine, M.P. 251–251.5° C.

EXAMPLE 5

5 grams of 2-methyl-4-[2-(5-nitrofuryl)-vinyl]-6-acetyl-aminopyrimidine is dissolved in 150 cc. of 20% hot ethanolic hydrochloric acid, followed by refluxing for 2 hours on water bath. After evaporating the ethanol, the residual mixture is neutralized with aqueous sodium bicarbonate. Precipitates which separate off are recrystallized from ethanol to give 3 grams of 2-methyl-4-[2-(5-nitrofuryl) - vinyl] - 6 - aminopyrimidine, M.P. 251–251.5° C.

EXAMPLE 6

1 gram of 2-methyl-4-[2-(5-nitrofuryl)-vinyl]-6-acetyl aminopyrimidine is dissolved in 25% hot ethanolic hydrochloric acid, followed by refluxing for 30 hours. The mixture is neutralized with aqueous sodium bicarbonate and products which separate off are recrystallized from ethanol to give 0.4 gram of 2-methyl-4-[2-(5-nitrofuryl)-vinyl]-6-hydroxypyrimidine, M.P. 300–303° C. (dec.).

EXAMPLE 7

2 grams of 2-isopropyl-4-methyl-6-acetylaminopyrimidine is added to a solution of 1.7 grams of 5-nitrofurfural in 3.4 cc. of acetic anhydride, followed by heating for 3 hours at 110–120° C. with stirring. After cooling, crystals which separate off are filtered and recrystallized from acetonitrile to give 2 grams of 2-isopropyl-4-[2-(5-nitrofuryl) - vinyl] - 6 - acetylaminopyrimidine, M.P. 228.6–230.1° C.

EXAMPLE 8

1 gram of 2 - isopropyl-4-[2-(5-nitrofuryl)-vinyl]-6-acetyl aminopyrimidine is dissolved in 20% hot ethanolic hydrochloric acid, followed by refluxing for 3 hours. After evaporating the ethanol, the residual mixture is neutralized with aqueous sodium bicarbonate and crystals which separate off are recrystallized from isopropanol to give 0.7 gram of 2 - isopropyl-4-[2-(5-nitrofuryl)-vinyl]-6-aminopyrimidine, M.P. 229–230° C.

EXAMPLE 9

2 grams of 2-isopropyl-4-[2-(5-nitrofuryl)-vinyl]-6-acetylaminopyrimidine is dissolved in 20% hot ethanolic hydrochloric acid, followed by refluxing for 26 hours on water bath. After evaporating the solvent, the residual mixture is neutralized with aqueous sodium bicarbonate. Precipitates which separate off are recrystallized from ethanol to give 1 gram of 2-isopropyl-4-[2-(5-nitrofuryl)-vinyl]-6-hydroxypyrimidine, M.P. 285° C. (dec.).

EXAMPLE 10

2.3 grams of 4 - methyl - 6 - acetylaminopyrimidine is added to a solution of 2.26 grams of 5-nitrofurfural in 6 cc. of acetic anhydride, followed by heating for 2 hours at 120° C. After cooling, crystals which separate off are filtered and recrystallized from acetonitrile to give 3 grams of 4-[2-(5-nitrofuryl)-vinyl]-6-acetylaminopyrimidine, M.P. 235–236.5° C.

EXAMPLE 11

7 grams of 4-[2-(5-nitrofuryl)-vinyl]-6-acetylaminopyrimidine is dissolved in 20 cc. of 20% hot ethanolic hydrochloric acid with heating, followed by refluxing for 2 hours. After concentration, water is added to the residue. The solution is neutralized with sodium bicarbonate and crystals which separate off are recrystallized from acetonitrile to give 4.5 grams of 4-[2-(5-nitrofuryl)-vinyl]-6-aminopyrimidine, M.P. 265–270° C.

EXAMPLE 12

5 grams of 4-[2-(5-nitrofuryl)-vinyl]-6-aminopyrimidine in 500 cc. of 20% hot hydrochloric acid are heated for 5 hours at 120° C. After concentrating under reduced pressure, the residue is neutralized with saturated aqueous sodium bicarbonate solution. Crystals which separate off are washed with water and recrystallized from acetonitrile to give 2.5 grams of 4-[2-(5-nitrofuryl)-vinyl]-6-hydroxypyrimidine, M.P. 300° C. (dec.).

EXAMPLE 13

14 grams of 5-nitrofurfural and 11 grams of 4-methyl-6-hydroxypyrimidine in 31 cc. of acetic anhydride are reacted by heating 8 hours at 120° C. After cooling, crystals which separate off are filtered and recrystallized from dilute acetonitrile to give 16.5 grams of 4-[2-(5-nitrofuryl)-vinyl]-6-hydroxypyrimidine, M.P. 300° C. (dec.).

EXAMPLE 14

11.4 grams of 5-nitrofurfural and 10 grams of 4-methyl-6-methoxypyrimidine in 25 cc. of acetic anhydride are reacted by heating for 9.5 hours at 120° C. After cooling, crystals which separate off are filtered and recrystallized from acetonitrile to give 15 grams of 4-[2-(5-nitrofuryl)-vinyl]-6-methoxypyrimidine, M.P. 217–218° C. (dec.).

Substitution of 4 - methyl-6-ethoxypyrimidine for 4-methyl - 6 - methoxypyrimidine in the procedure affords 4 - [2 - (5 - nitrofuryl)-vinyl]-6-ethoxypyrimidine, M.P. 158–159° C.

EXAMPLE 15

14.1 grams of 5-nitrofurfural, 12.3 grams of 4-methyl-6-methylaminopyrimidine and 30 cc. of glacial acetic acid are reacted by heating for one hour at 110° C. After cooling, crystals which separate off by adding water to the mixture are filtered and recrystallized from acetonitrile to give 17 grams of 4-[2-(5-nitrofuryl)-vinyl]-6-methyl aminopyrimidine, M.P. 250° C. (dec.).

EXAMPLE 16

14.1 grams of 5-nitrofurfural and 13.7 grams of 4-methyl-6-dimethylaminopyrimidine in 31 cc. of acetic anhydride are reacted by heating for one hour at 120° C. After cooling, crystals which separate off are filtered and recrystallized from acetone to give 18 grams of 4-[2-(5-nitrofuryl)-vinyl]-6-dimethylaminopyrimidine, M.P. 267–268° C.

EXAMPLE 17

14.1 grams of 5-nitrofurfural and 15.1 grams of 2,4-dimethyl-6-dimethylaminopyrimidine in 30 cc. of acetic anhydride are reacted by heating for 2 hours at 130–140° C. After cooling, crystals which separate off are filtered and recrystallized from acetone to give 19 grams of 2 - methyl-4-[2-(5-nitrofuryl)-vinyl]-6-dimethylaminopyrimidine, M.P. 220–222° C.

EXAMPLE 18

5 grams of 4-[2-(5-nitrofuryl)-vinyl]-6-aminopyrimidine and 180 cc. of 37% formalin are reacted by heating for 2 hours at 90–100° C. After cooling, crystals which separate off by adding 300 cc. of water to the mixture are filtered and recrystallized from diluted ethanol to give 4 grams of 4 - [2 - (5 - nitrofuryl)-vinyl]-6-hydroxymethyl-aminopyrimidine, M.P. 200° C. (dec.).

What is claimed is:

1. A compound of the following formula

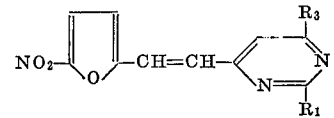

in which $R_1$ is a member selected from the group consisting of hydrogen and lower alkyls having 1 to 3 carbon atoms; and $R_3$ is a member selected from the group consisting of hydroxyl, amino, hydroxymethyl amino, acetyl amino and propionyl amino.

2. 2 - methyl - 4 - [2 - (5-nitrofuryl)-vinyl]-6-aminopyrimidine.

3. 2 - methyl - 4 - [2 - (5 - nitrofuryl)-vinyl]-6-hydroxypyrimidine.

4. 4-[2-(5-nitrofuryl)-vinyl]-6-aminopyrimidine.

5. 2 - isopropyl - 4 - [2 - (5-nitrofuryl)-vinyl]-6-hydroxypyrimidine.

6. 4 - [2 - (5 - nitrofuryl) - vinyl]-6-hydroxypyrimidine.

No references cited.

JOHN D. RANDOLPH, Primary Examiner

U.S. Cl. X.R.

260—999